United States Patent
Reddy et al.

(10) Patent No.: US 7,156,175 B2
(45) Date of Patent: *Jan. 2, 2007

(54) METHODS OF GENERATING GAS IN WELL FLUIDS

(75) Inventors: B. Raghava Reddy, Duncan, OK (US); Krishna M. Ravi, Kingwood, TX (US); James E. Griffith, Duncan, OK (US); Frank Zamora, Duncan, OK (US); Karen Luke, Duncan, OK (US); John L. Dennis, Jr., Marlow, OK (US); Ricky A. Cox, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/789,712

(22) Filed: Feb. 27, 2004

(65) Prior Publication Data

US 2004/0168830 A1    Sep. 2, 2004

Related U.S. Application Data

(63) Continuation of application No. 10/159,590, filed on May 31, 2002, now Pat. No. 6,715,553.

(51) Int. Cl.
*E21B 43/22* (2006.01)
*E21B 43/27* (2006.01)

(52) U.S. Cl. ............ 166/300; 166/305.1; 166/307; 166/309; 166/312; 507/202; 507/267; 507/260; 507/244; 507/251; 507/272

(58) Field of Classification Search ......... 166/300, 166/305.1, 309, 312; 175/69, 72; 507/102, 507/202; 106/672, 677, 820

See application file for complete search history.

(56) References Cited

U.S. PATENT DOCUMENTS

| | | | |
|---|---|---|---|
| 3,591,394 A | 7/1971 | Diggelmann et al. | |
| 3,958,638 A | 5/1976 | Johnston | 166/294 |
| 3,977,470 A | 8/1976 | Chang | 166/273 |
| 4,121,674 A | 10/1978 | Fischer et al. | 175/66 |
| 4,142,909 A | 3/1979 | Gaines | |
| 4,219,083 A | 8/1980 | Richardson et al. | 166/300 |
| 4,232,741 A | 11/1980 | Richardson et al. | 166/281 |
| 4,289,633 A | 9/1981 | Richardson et al. | |
| 4,304,298 A | 12/1981 | Sutton | 166/293 |
| 4,333,764 A | 6/1982 | Richardson | |
| 4,340,427 A | 7/1982 | Sutton | |
| 4,367,093 A | 1/1983 | Burkhalter et al. | |
| 4,450,010 A | 5/1984 | Burkhalter et al. | |
| 4,565,578 A | 1/1986 | Sutton et al. | |
| 4,692,269 A | 9/1987 | Kmiec et al. | 252/350 |
| 4,741,401 A | 5/1988 | Walles et al. | 166/300 |
| 4,813,484 A | 3/1989 | Hazlett | 166/270 |
| 4,832,123 A | 5/1989 | Abou-Sayed et al. | 166/281 |
| 4,844,163 A | 7/1989 | Hazlett et al. | 166/270 |
| 5,373,901 A | 12/1994 | Norman et al. | 166/300 |
| 5,495,891 A | 3/1996 | Sydansk | 166/295 |
| 5,613,558 A | 3/1997 | Dillenbeck, III | 166/293 |
| 5,658,380 A | 8/1997 | Dillenbeck, III | 106/823 |
| 5,789,352 A | 8/1998 | Carpenter et al. | 507/209 |
| 5,962,808 A | 10/1999 | Lundstrom | 149/19.1 |
| 5,996,693 A | 12/1999 | Heathman | 166/291 |
| 6,035,933 A | 3/2000 | Khalil et al. | 166/263 |
| 6,063,738 A | 5/2000 | Chatterji et al. | 507/269 |
| 6,138,760 A | 10/2000 | Lopez et al. | 166/300 |
| 6,162,839 A | 12/2000 | Klauck et al. | 521/83 |
| 6,209,646 B1 | 4/2001 | Reddy et al. | 166/300 |
| 6,270,565 B1 | 8/2001 | Heathman | 106/696 |
| 2004/0110643 A1 | 6/2004 | Zevallos | |

FOREIGN PATENT DOCUMENTS

RU    2047642    10/1995

*Primary Examiner*—George Suchfield
(74) *Attorney, Agent, or Firm*—Craig W. Roddy; Baker Botts, L.L.p.

(57) ABSTRACT

The present invention relates to methods of chemically generating gas in aqueous fluids utilized in the drilling and completion of wells such as drilling fluids, spacer fluids, and aqueous acid solutions. In one embodiment, the invention provides a method of preventing the formation of fractures in a subterranean formation during a drilling operation. In other embodiments, the present invention provides methods of separating a first fluid and a second fluid in a subterranean formation; methods of forming lightweight well treatment fluids; methods of enhancing the permeability of a subterranean zone; lightweight drilling fluids; lightweight spacer fluids; foamed aqueous acidic well treatment fluids; and methods of making foamed aqueous and aqueous acidic well treatment fluids.

11 Claims, No Drawings

METHODS OF GENERATING GAS IN WELL FLUIDS

CROSS-REFERENCE TO RELATED APPLICATIONS

This application is a continuation of application Ser. No. 10/159,590, entitled Methods of Generating Gas in Well Fluids, filed on May 31, 2002, now U.S. Pat No. 6,715,553 which is hereby incorporated in its entirety by reference.

BACKGROUND OF THE INVENTION

1. Field of the Invention

The present invention relates to methods of chemically generating gas in aqueous fluids utilized in the drilling and completion of wells such as drilling fluids, spacer fluids and aqueous acid solutions.

2. Description of the Prior Art

Foamed aqueous fluids have heretofore been utilized in a number of oil and gas well applications. Typically, the aqueous fluids are foamed by combining mixtures of foaming and foam stabilizing surfactants with the fluids on the surface followed by injecting gas, typically nitrogen, into the fluids containing the foaming and foam stabilizing surfactants as the fluids are pumped to the well head and into the well bore. This process allows the final foamed fluid to have gas concentrations of 1% to 80% by volume of the fluid depending on the downhole pressure and temperature and the amount of gas injected at surface. The equipment and personnel required for storing the nitrogen in liquid or gaseous form and injecting it into well fluids is very elaborate and expensive. In addition, the equipment is frequently unavailable or cannot be easily transported to well sites due to their remote locations.

In-situ gas forming agents have been utilized heretofore in well cement compositions to prevent annular gas migration. For example, surfactant coated finely ground aluminum has been included in cement compositions to generate hydrogen gas in the compositions as they are being pumped down a well bore and after they are placed in the annulus between the walls of the well bore and casing or other pipe string therein. The presence of the gas in the cement compositions prevents formation fluids from entering the cement compositions as the cement compositions develop gel strength. That is, the development of gel strength and the cement hydration reaction that takes place reduces the ability of a cement composition column to transmit hydrostatic pressure. If the hydrostatic pressure of the cement composition column falls below the formation pore pressure before the cement composition has gained sufficient strength to prevent the entry of formation fluids into the well bore, the fluids enter the well bore and form channels in the cement composition column which remain after the cement composition column sets. The presence of the gas which is generated in the cement composition from the finely ground aluminum increases the volume of the cement composition such that the volume increase generated by the gas equals or slightly exceeds the cement composition volume reduction during the development of gel strength due to fluid loss and/or the cement hydration reaction. The increase in volume, typically less than 5%, and the compressibility produced in the cement composition by the gas allows the cement composition column to resist the entry of formation fluids into the well bore.

Other gas forming agents have also been added to well cement compositions to gasify the compositions. For example, U.S. Pat. No. 4,450,010 issued on May 22, 1984 to Burkhalter et al. discloses a well cementing method and gasified cements useful in carrying out the method. That is, U.S. Pat. No. 4,450,010 discloses a method of cementing in subterranean formations using a gasified cement composition which prevents formation fluids from entering the cement composition column formed in the annulus between the well bore and a pipe string therein. The cement composition includes a nitrogen gas generating material, an oxidizing agent and a reaction rate control material whereby a quantity of gas is generated in the cement composition to offset the shrinkage in the cement composition column as it develops gel strength and to provide compressibility thereto whereby the entry of formation fluids into the well bore is reduced or prevented.

A situation where the presence of gas would provide a distinct advantage involves problems associated with high fluid pressure buildup behind casing. Occasionally, aqueous drilling fluids, spacer fluids or both are left behind casing during the cementing phase of well construction. When the well is put on production, the formation temperature heats up the trapped drilling and/or spacer fluids causing severe high pressure buildups due to the incompressibility of the fluids which can cause damage to the casing. The presence of a compressible gas behind the casing in drilling fluids, spacer fluids and the like, either in the form of a gas pocket or foam would help sustain the temperature increases without severe pressure buildups.

Other applications where the presence of gas in aqueous drilling fluids, aqueous spacer fluids, aqueous acid solutions and the like would provide distinct advantages include drilling and well treating fluid hydrostatic pressure reduction to prevent formation fractures, drill cuttings removal, the displacement of drilling fluids in an eccentric annulus, hydrostatic fracture pressure control, fluid loss control and spent acid solution recovery.

SUMMARY OF THE INVENTION

The present invention relates to methods of chemically generating gas in aqueous fluids utilized in the drilling and completion of wells such as drilling fluids, spacer fluids and aqueous acid solutions.

In one embodiment, the present invention provides a method of preventing the formation of fractures in a subterranean formation during a drilling operation that comprises the steps of providing a lightweight drilling fluid that comprises an aqueous fluid and generated gas, the generated gas being generated by a reaction of a gas generating chemical in the aqueous fluid, the gas generating chemical being present in an amount of from about 0.1% to about 10% by weight of the aqueous fluid; and using the lightweight drilling fluid in the drilling operation to drill a well bore in the subterranean formation.

In one embodiment, the present invention provides a method of separating a first fluid and a second fluid in a subterranean formation that comprises the steps of providing a lightweight spacer fluid that comprises an aqueous fluid and generated gas, the generated gas being generated by a reaction of a gas generating chemical in the aqueous fluid, the gas generating chemical being present in an amount of from about 0.1% to about 10% by weight of the aqueous fluid; providing a first fluid and a second fluid, the second fluid to be introduced to the subterranean formation after the first fluid; placing the first fluid into the subterranean formation; placing the lightweight spacer fluid into the subterranean formation to substantially separate the first fluid from the second fluid; and placing the second fluid into the subterranean formation.

In another embodiment, the present invention provides a method of forming a lightweight well treatment fluid that comprises a gas for use in a subterranean formation that comprises the steps of mixing an aqueous fluid, a surfactant, and a gas generating chemical, the gas generating chemical being present in an amount of from about 0.1% to about 10% by weight of a water component in the aqueous fluid, to form a well treatment fluid; and allowing the gas generating chemical to react so as to generate a gas in the well treatment fluid to form a lightweight well treatment fluid.

In another embodiment, the present invention provides a method of enhancing the permeability of a subterranean zone that comprises the steps of allowing a gas generating chemical to react in an aqueous fluid to generate generated gas; adding the generated gas to an aqueous acidic well treatment fluid to produce a foamed aqueous acidic well treatment fluid; and using the foamed aqueous acidic well treatment fluid in a treatment to enhance the permeability of a subterranean zone.

In another embodiment, the present invention provides a lightweight drilling fluid that comprises an aqueous fluid and a gas generated by a reaction of a gas generating chemical in the aqueous fluid, the gas generating chemical being present in an amount of from about 0.1% to about 10% by weight of the aqueous fluid.

In another embodiment, the present invention provides a lightweight spacer fluid that comprises an aqueous fluid and a gas generated by a reaction of a gas generating chemical in the aqueous fluid, the gas generating chemical being present in an amount of from about 0.1% to about 10% by weight of the aqueous fluid.

In another embodiment, the present invention provides a foamed aqueous acidic well treatment fluid that comprises an acid component and generated gas, the generated gas being a product of a reaction of a gas generating chemical in an aqueous fluid.

In another embodiment, the present invention provides a method of making a foamed aqueous acidic well treatment fluid that comprises the steps of reacting a gas generating chemical in an aqueous fluid to generate some generated gas; and incorporating the generated gas into an aqueous acidic well treatment fluid to produce a foamed aqueous acidic well treatment fluid.

In one embodiment, the present invention provides a method of making a foamed well fluid that comprises a gas that comprises the steps of combining an aqueous fluid, a surfactant, and a gas generating chemical, the gas generating chemical being present in an amount in the range of from about 0.1% to 100% of a water component in the aqueous well fluid; and allowing the gas generating chemical to react so that gas is generated in the aqueous fluid to form a foamed well fluid. In another aspect, the present invention provides a foamed well fluid made by the methods provided herein.

The features and advantages of the present invention will be readily apparent to those skilled in the art upon a reading of the description of the preferred embodiments, which follows.

DESCRIPTION OF PREFERRED EMBODIMENTS

The present invention provides improved methods of generating gas in and foaming aqueous well fluids such as aqueous drilling fluids, aqueous spacer fluids, aqueous acid solutions and the like.

Aqueous well drilling fluids are generally solids containing water based gels which can include a weighting material. When a lightweight aqueous drilling fluid is required in order to prevent the hydrostatic pressure of the drilling fluid from creating fractures in weak formations, the drilling fluid can be foamed in accordance with this invention.

Aqueous spacer fluids are often used in oil and gas wells to facilitate improved displacement efficiency when pumping new fluids into the well bore. The spacer fluids are typically placed between one or more fluids contained within or to be pumped within the well bore. Examples include placing spacer fluids between a hydraulic cement slurry and a drilling fluid, between different drilling fluids during drilling fluid change outs or between a drilling fluid and a completion brine. Spacers are also used to enhance solids removal during drilling operations, to enhance displacement efficiency and to physically separate chemically incompatible fluids.

Most spacer fluids are comprised of water, a viscosity and fluid loss control additive, a weighting material and a surfactant. The weighting material included in the spacer fluid is to increase its density for well control and increase the buoyancy effect of the spacer fluid on the gelled drilling fluid and filter cake adhered to the walls of the well bore. Viscosity additives are intended to produce Theological properties which provide suspended particle stability and fluid loss control to the spacer fluid. When a surfactant is included in the spacer fluid it is intended to enhance the chemical compatibility of the spacer fluid with the other fluids and to water-wet surfaces for an improved cement bond and better removal of well bore solids. In some applications, it is desirable to foam spacer fluids to improve fluid displacement and for reducing the hydrostatic pressure of the fluid column in the well bore.

In accordance with the methods of this invention, one or more gas generating chemicals are combined with an aqueous well fluid on the surface. At approximately the same time, a mixture of foaming and foam stabilizing surfactants and when needed, an activator for said one or more gas generating chemicals selected from a base or buffer for increasing the pH of the well fluid to in the range of from about 10 to about 14 or one or more oxidizing chemicals with or without one or more rate control agents are combined with the aqueous well fluid so that the gas generating chemicals react with the alkaline well fluid or the oxidizing chemicals and gas and foam are formed in the well fluid while it is being pumped. Thereafter, the well fluid is pumped into a well bore.

When the methods of this invention are utilized to foam aqueous well fluids that are already alkaline, i.e., have a pH in the range of from about 10 to about 14, the activators described above are not needed. That is, the gas generating chemicals react with the alkaline aqueous well fluids upon mixing therewith.

The gas generating chemicals useful in accordance with this invention primarily generate nitrogen along with small amounts of ammonia depending on the chemical structure and the activating chemical or chemicals. When the gas generating chemical molecule contains amide groups, additional ammonia, carbon dioxide (an acidic gas), and carbon monoxide may be produced. The gas generating chemicals are generally solid materials that liberate gas or gases on their own when they are heated to a temperature in the range of from about 200° F. to about 500° F. without requiring alkaline conditions or oxidizing chemicals. In order to cause the gas generating chemicals to generate gases at a temperature below about 200° F., e.g., at ambient temperature, an alkaline chemical or an oxidizing chemical with or without a rate control agent can be combined with the aqueous well fluid containing the one or more gas generating chemicals and foaming and foam stabilizing surfactants. Depending on the structure of the gas generating chemical, it may dissolve in the aqueous well fluid or it may have to be used as a dispersion.

Examples of gas generating chemicals which can be utilized in accordance with the methods of the present invention include, but are not limited to, chemicals containing hydrazine or azo groups such as hydrazine, azodicarbonamide, azobis(isobutyronitrile), p-toluene sulfonyl hydrazide, p-toluene sulfonyl semicarbazide, carbohydrazide, p-p'-oxybis(benzenesulfonyl hydrazide), and mixtures thereof. Other examples of nitrogen generating chemicals include, but are not limited to, ammonium salts of organic or inorganic acids, hydroxylamide sulfate, carbamide and mixtures thereof. Of the gas generating chemicals which can be used, azodicarbonamide and carbohydrazide are preferred. The gas generating chemical or chemicals utilized are combined with the aqueous well fluid in a general amount, depending on the amount of gas desired under downhole conditions, in the range of from about 0.1% to about 10% by weight of water in the aqueous well fluid, more preferably in an amount in the range of from about 0.3% to about 8% and most preferably about 4%.

The generation of gas from the gas generating chemicals depends on the structure of the gas generating chemicals. When the chemical contains an azo group containing two nitrogens connected by a double bond as in azodicarbonamide, the gas generation is caused either thermally or by reaction with alkaline reagents which by reacting with the azocarbonamide generate ammonia gas, carbon dioxide and release the doubly charged diimide group. The diimide dianion being chemically unstable decomposes to nitrogen gas.

The gas generating chemicals containing hydrazide groups in which the two nitrogen atoms are connected by a single bond as well as connected to one or two hydrogens produce gas upon reaction with oxidizing chemicals. It is believed that the oxidizing agent oxidizes the hydrazide group to azo structure. Occasionally, additional activator chemicals may be needed to increase the rate of gas production.

While various activators can be utilized to make the aqueous well fluid to be foamed alkaline, a preferred activator is a base such as alkali metal hydroxides, alkaline earth metal hydroxides or alkaline metal salts of silicates present in the well fluid in an amount sufficient to maintain the pH of the fluid in the 10 to 14 range during the gas production phase. A buffer composition which can maintain the pH in the desired range can also be used. Examples of suitable buffer compositions include mixtures of potassium phosphate and potassium monohydrogenphosphate or sodium carbonate and sodium bicarbonate.

Examples of the oxidizing chemical activators which can be used include, but are not limited to, alkaline and alkaline earth metal salts of peroxide, persulfate, perborate, chlorite, chlorate, iodate, bromate, chloroaurate, arsenate, antimonite and molybate anions. Specific examples of the oxidizing agents include ammonium persulfate, sodium persulfate, potassium persulfate, sodium chlorite, sodium chlorate, hydrogen peroxide, sodium perborate and sodium peroxy carbonate. Other examples of oxidizing chemicals which can be used in the present invention are disclosed in U.S. Pat. No. 5,962,808 issued to Landstrom on Oct. 5, 1999 which is incorporated herein by reference thereto. Of the oxidizing chemicals which can be used, sodium persulfate and sodium chlorite are the most preferred. When used, one or more oxidizing chemicals are included in the well fluid in an amount in the range of from about 200% to about 1500% by weight of the gas generating chemical or chemicals therein, more preferably in an amount in the range of from about 400% to about 1200% by weight of the gas generating chemical or chemicals. The oxidizing chemical or chemicals used and their amounts are selected for their ability to cause the gas generating chemical or chemicals to generate gas at a particular temperature or range of temperatures. The temperatures at which various oxidizing chemicals cause a particular gas generating chemical to produce gas can be readily determined in the laboratory.

As mentioned above, a gas production rate enhancing agent can be used when rapid gas production is desired. Examples of such rate enhancing agents include, but are not limited to, copper salts such as copper sulfate and iron salts including ferric sulfate or ferric nitrate. When used, the gas production rate enhancing agent is included in the well fluid in an amount in the range of from about 5% to about 25% by weight of the gas generating chemical or chemicals therein.

The mixture of foaming and foam stabilizing surfactants is combined with the aqueous well fluid to facilitate the formation and stabilization of foam in the well fluid produced by the liberation of gas therein. An example of such a mixture of foaming and foam stabilizing surfactants which is preferred for use in accordance with this invention is comprised of a mixture of an ethoxylated alcohol ether sulfate surfactant, an alkyl or alkene amidopropylbetaine surfactant and an alkyl or alkene amidopropyldimethylamine oxide surfactant. Such a surfactant mixture is described in U.S. Pat. No. 6,063,738 issued to Chatterji et al. on May 16, 2000 which is incorporated herein by reference thereto. The mixture of foaming and foam stabilizing surfactants is present in said well fluid in an amount in the range of from about 0.5% to about 5% by weight of water in the aqueous well fluid.

Thus, an improved method of this invention for generating gas in and foaming an aqueous drilling fluid, an aqueous spacer fluid or other similar aqueous well fluid pumped into a subterranean zone penetrated by a well bore is comprised of the steps of: combining with the aqueous well fluid one or more gas generating chemicals, a mixture of foaming and foam stabilizing surfactants and when needed, an activator for the one or more gas generating chemicals selected from the group consisting of a base or buffer for increasing the pH of the well fluid to in the alkaline range of from about 10 to about 14 and an oxidizing agent so that the gas generating chemicals react with the alkaline well fluid or the oxidizing agent and gas and foam are formed in the well fluid while it is being pumped; and pumping the aqueous well fluid into the well bore and the subterranean zone.

As mentioned above the well fluid can optionally include a rate enhancing chemical to increase the rate of gas production from the one or more gas generating chemicals at a selected temperature.

Another preferred improved method of this invention for generating gas in and foaming an aqueous well fluid such as an aqueous drilling fluid, an aqueous spacer fluid and the like which is pumped into a subterranean zone penetrated by a well bore is comprised of the steps of: combining with the aqueous well fluid a gas generating chemical comprised of azodicarbonamide in an amount in the range of from about 0.3% to about 8% by weight of water in the aqueous well fluid, a mixture of foaming and foam stabilizing surfactants present in an amount in the range of from about 0.5% to about 5% by weight of water in the aqueous well fluid and an activator for the gas generating chemical selected from the group consisting of a base or buffer in an amount sufficient to increase the pH of the well fluid to in the range of from about 10 to about 14 so that the gas generating chemical reacts with the alkaline well fluid and gas and foam is formed in the well fluid while it is being pumped; and pumping the well fluid into the well bore and the subterranean zone.

Yet another preferred improved method of this invention for generating gas in and foaming an aqueous well fluid such as an aqueous drilling fluid, an aqueous spacer fluid and the like which is pumped into a subterranean zone penetrated by a well bore is comprised of the steps of: combining with the aqueous well fluid a gas generating chemical comprised of azodicarbonamide in an amount in the range of from about 0.3% to about 8% by weight of water in the aqueous well fluid, a mixture of foaming and foam stabilizing surfactants present in an amount in the range of from about 0.5% to about 5% by weight of water in the aqueous well fluid and an activator for the gas generating chemical comprised of an oxidizing chemical so that the gas generating chemical reacts with the oxidizing chemical and gas and foam are formed in the aqueous well fluid while it is being pumped; and pumping the aqueous well fluid formed in step (a) into the well bore and the subterranean zone.

In certain circumstances, it is desirable to foam an aqueous acid solution which is introduced into a subterranean zone to increase the hydrocarbon permeability of the zone. The presence of the gas in the foamed acid solution assists in the recovery of the spent acid from the subterranean zone.

In accordance with the present invention, an aqueous solution or dispersion of one or more gas generating chemicals is combined with an activator for the gas generating chemicals selected from the group consisting of a base or buffer for increasing the pH of the aqueous solution or dispersion to in the alkaline range of from about 10 to about 14 and an oxidizing chemical so that the gas generating chemicals react with the alkaline solution or dispersion or the oxidizing chemical on the surface to generate gas. The gas is then combined with the aqueous acid solution in an amount sufficient to foam the aqueous acid solution as the aqueous acid solution is pumped into the well bore and into the subterranean zone to be acidized whereby the aqueous acid solution is foamed.

One or more of the gas generating chemicals described above can be utilized to form the aqueous solution or dispersion of gas generating chemicals. The water utilized can be any type of water so long as it does not contain components which adversely react with the gas generating chemicals. The activator can be a base or buffer as described above or one or more of the oxidizing chemicals described above. Generally, the gas generating chemical or chemicals used are included in the solution or dispersion in an amount in the range of from about 10% to about 100% by weight of water therein. As mentioned, when the activator is a base or buffer it is added to the aqueous solution or dispersion in an amount sufficient to raise the pH of the solution or dispersion to in the range of from 10 to about 14. One or more of the oxidizing chemical activators described above can be utilized instead of or in addition to the base or buffer in an amount in the range of from about 400% to about 1200% by weight of the gas generating chemical or chemicals in the solution or dispersion.

When a base or buffer activator or an oxidizing chemical activator, or both, are combined with the aqueous solution or dispersion of one or more gas generating chemicals, the gas evolved from the mixture is collected and combined with the aqueous acid solution which can include a mixture of foaming and foam stabilizing surfactants such as linear alcohol ($C_{10}$–$C_{13}$) ethoxylates (e.g., 10–20 moles ethylene oxide), betaines (e.g., cocoamidopropyl betaine) and nonylphenol ethoxylate (e.g., 2 moles ethylene oxide) in an amount in the range of from about 1% to 5% by weight of water in the combined acid solution.

The aqueous acid solution utilized can include, but is not limited to hydrochloric acid, hydrofluoric acid, fluoroboric acid and mixtures thereof. The aqueous acid solution can also include one or more organic acids including, but not limited to, formic acid, acetic acid, citric acid, lactic acid, thioglycolic acid and glycolic acid. Generally, the inorganic acid is present in the aqueous acid solution in an amount in the range of from about 5% to about 30% by weight of the aqueous acid solution. When used, the organic acid can be present in an amount up to about 10% by weight of the aqueous acid solution.

An improved method of this invention for chemically generating gas and foaming an aqueous acid solution which is introduced into a subterranean zone penetrated by a well bore to increase the hydrocarbon permeability of the zone, the presence of the gas in the foamed acid solution assisting in the recovery of the spent acid from the subterranean zone, comprising the steps of: (a) combining an aqueous solution or dispersion of one or more gas generating chemicals with an activator for the gas generating chemicals selected from the group consisting of a base or buffer for increasing the pH of the aqueous solution or dispersion to in the alkaline range of from about 10 to about 14 and an oxidizing chemical so that the gas generating chemicals react with the alkaline well fluid or the oxidizing chemical on the surface to generate gas; and (b) combining the gas with the aqueous acid solution in an amount sufficient to foam the aqueous acid solution as the aqueous acid solution is pumped into the well bore and the subterranean zone to be acidized whereby the aqueous acid solution is foamed.

In order to further illustrate the methods of the present invention, the following examples are given. In no way should the following examples be read to limit or define the scopes of the invention.

EXAMPLE 1

A spacer fluid was prepared as described in U.S. Pat. No. 5,789,352 issued to Carpenter et al. on Aug. 14, 1998 which is incorporated herein by reference thereto. An aqueous mixture of foaming and foam stabilizer surfactants comprising alcohol ether sulfate, cocoamidopropyl betaine and an amine oxide in water was stirred by hand into the spacer fluid in an amount of about 1.83% by weight of water in the spacer fluid. The density of the spacer fluid was 16.35 pounds per gallon and the pH of the fluid was 9.1. In a graduated cylinder containing 20 ml of the spacer fluid, azodicarbonamide was added in an amount of 2% by weight of water present in the spacer fluid. The pH was adjusted to 12.2 by the addition of a few drops of 17% sodium hydroxide solution. As the resulting reaction progressed, the pH decreased. Periodically, the pH was adjusted to 12.2 by additional sodium hydroxide solution. The final fluid volume was 42 ml and final density was 7.73 pounds per gallon. The percent nitrogen gas present in the fluid was 50% by volume.

An identical experiment to the above was performed by substituting toluene sulfonyl hydrazide for the azodicarbonamide in an amount of 3% by weight of water in the spacer fluid. Additionally, 2.5 ml of 37% sodium persulfate solution in water was added in 0.5 ml portions. The pH was adjusted to 11.0 periodically as necessary. At the end of the experiment, the volume of the foamed fluid was 42 ml (density—7.84 pounds per gallon; % nitrogen gas in the fluid—48% by volume).

Another experiment identical to the preceding experiment was conducted by substituting 37% by volume sodium chlorite solution in water for the 37% by volume sodium persulfate solution. The initial pH was adjusted to 10.7. No additional pH adjustment was found necessary during the course of the addition of the sodium chlorite solution. The final volume of 48 ml (density—7.28 pounds per gallon; % nitrogen gas—54% by volume) was reached much quicker (10 min vs. 2 ills) than in the preceding case.

Another experiment identical to the preceding experiment was performed by replacing toluene sulfonyl hydrazide with 1% carbohydrazide by weight of water. A pH adjustment was not necessary since the pH did not change during the course of the reaction. The final volume at the end of the reaction period, was 70 ml (density—4.9 pounds per gallon; % nitrogen gas—68% by volume).

Another experiment identical to the preceding experiment was performed by replacing the sodium chlorite with an equal volume of 37% sodium persulfate solution. The final volume was 40 ml (density—8.75 pounds per gallon; % nitrogen gas—45% by volume). The above experiments clearly demonstrate that spacer fluid compositions used in oil well operations can be foamed by generating nitrogen gas in-situ.

EXAMPLE 2

A test was conducted using Halliburton's UCA (Ultrasonic Cement Analyzer) equipment. About 110 ml of a drilling fluid was placed in the UCA cell with a volume capacity of 220 ml. The cell was pressurized to 2000 psi and placed in the UCA heating jacket. The temperature was brought to 80° F.

A sample of the spacer fluid described in Example 1 including the mixture of the foaming and foam stabilizing surfactants was placed in a stirring autoclave and heated to 80° F. A pressure of 2000 psi was applied and the sample of spacer fluid was foamed to contain specified volume of air. The foamed spacer fluid was transferred under pressure into the UCA cell. The UCA was programmed to heat up to 200° F. over a specified period. The resulting pressure increases were recorded at 140° F., 180° F. and 200° F. The test was repeated with different drilling fluids and spacer fluids containing different volumes of air and finally with tap water. The results are presented in the Table below.

TABLE

Drilling and Spacer Fluids Tested and Resulting Pressures

| Fluid Sample | 80° F. | 140° F. | 180° F. | 200° F. |
| --- | --- | --- | --- | --- |
| 100% "NOVA Plus ™"[1] | 2000 psi | 5400 psi | 9200 psi | 10,000 psi |
| 50% "NOVA Plus ™" and 50% - Spacer with 10% air | 2000 psi | 2100 psi | 2400 psi | 2600 psi |
| 50% "NOVA Plus ™" and 50% - Spacer with 20% air | 2000 psi | 2100 psi | 2300 psi | 2400 psi |
| 50% "NOVA Plus ™" and 50% - Spacer with 40% air | 2000 psi | 2000 psi | 2100 psi | 2200 psi |
| 100% "Cal-Drill Mud ™"[2] | 2000 psi | 6500 psi | 10,000 psi | 11,400 psi |
| 50% "Cal-Drill Mud ™" and 50% - Spacer with 10% air | 2000 psi | 3000 psi | 3700 psi | 3800 psi |
| 50% "Cal-Drill Mud ™" and 50% - Spacer with 20% air | 2000 psi | 2500 psi | 2700 psi | 2900 psi |
| 50% "Cal-Drill Mud ™" and 50% - Spacer with 40% air | 2000 psi | 2100 psi | 2200 psi | 2250 psi |
| 65% Oil/ester based drilling fluid and 35% Spacer with 10% in-situ generated nitrogen | 2000 psi | 2200 psi | 2300 psi | 2500 psi |
| Tap Water | 2000 psi | 4800 psi | 8200 psi | 10,300 psi |

[1]According to the information provided by the supplier, MI Fluids of Houston, Texas, the drilling fluid contained C16–C18 Internal Olefins (80%), water (5–40%), calcium chloride (15–30%), viscosifier (3–10 pounds per barrel), emulsifier (6–8 pounds per barrel), wetting agent (2–4 pounds per barrel), rheology modifier (1–3 pounds per barrel) and lime 4 to 8 pounds per barrel.
[2]According to the information provided by the supplier, MI Fluids of Houston, Texas, the drilling fluid contained calcium chloride brine (9.6 pounds per gallon), a polymer (D-I50, 2 pounds per barrel), attapulgite (5 pounds per barrel), biopolymer (1 pound per barrel) and defoamer (0.5 pounds per barrel).

The results clearly show that when a gas is present in a fluid system, for example, as would be in the case of spacer and drilling fluid left behind a casing in a completed oil well, the pressure increases exerted on the pipe due to heating of the fluids by the formation are less when the fluids contain gas than when there is no gas present. The prevention of excessive pressure buildup behind a casing in a well prevents well blowouts and casing collapses.

EXAMPLE 3

A representative water-based drilling fluid was prepared by mixing with shear in a Waring blender bentonite clay (10 pounds per barrel), mixed metal silicate available from Baroid Corporation under the trade name "RV-310™" (0.75 pounds per barrel), carboxymethylcellulose (4 pounds per barrel), barium sulfate in tap water (90 pounds per barrel), and a foaming and foam stabilizing surfactant mixture comprising alcohol ether sulfate, cocoamidopropyl betaine and an amine oxide in water was stirred by hand into the drilling fluid (3.5% by weight of water in the drilling fluid). The density of the resulting drilling fluid was 9.72 pounds per gallon, and the pH of the fluid was 11.94.

In a graduated cylinder containing 20 ml of the drilling fluid solid azodicarbonamide was added (0.5% by weight of water) with gentle stirring. In 90 minutes, the volume increased to 28 ml (density—6.91 pounds per gallon).

Another experiment identical to the preceding experiment was performed except that 1% azodicarbonamide by weight of water was added to the drilling fluid. In 90 minutes, the volume increase was same as in the preceding experiment. The pH was not adjusted in either of the above experiments.

Another experiment identical to the preceding was performed except that the azodicarbonamide was replaced with carbohydrazide (0.5% by weight of water). To this mixture, 1 ml of 37% sodium chlorite solution was added with stirring. In 15 minutes, the fluid volume increased to 30 ml (density—6.45 pounds per gallon).

The above results show that drilling fluids can be foamed by chemically generating nitrogen gas in-situ.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method for treating a subterranean formation comprising:
   providing a mixture of an aqueous fluid, a surfactant, and a gas generating chemical, the gas generating chemical being present in an amount of from about 0.1% to about 10% by weight of a water component in the aqueous fluid, to form a well treatment fluid; allowing the gas generating chemical to react so as to generate a gas in the well treatment fluid to form a lightweight well treatment fluid; and treating the subterranean formation by combining the lightweight well treatment fluid with fluids and/or solids in the subterranean formation to enhance the removal of the fluids and/or solids therefrom.

2. The method of claim 1, wherein the aqueous fluid comprises an activator that comprises at least one component selected from the group consisting of: a base, a buffer, and an oxidizer.

3. The method of claim 1, wherein the generated gas is generated in the lightweight well treatment fluid while the lightweight well treatment fluid is being combined with fluids and/or solids in the subterranean formation.

4. The method of claim 1, wherein the generated gas comprises at least one component selected from the group consisting of: nitrogen, ammonia, carbon dioxide, and carbon monoxide.

5. The method of claim 1, wherein the lightweight well treatment fluid or the aqueous fluid comprises a gas production rate enhancing agent.

6. The method of claim 5, wherein the gas production rate enhancing agent comprises a salt selected from the group consisting of: a copper salt and an iron salt.

7. The method of claim 1, wherein the gas generating chemical comprises a component selected from the group consisting of: a hydrazine group, an azo group, hydrazine, azodicarbonamide, azobis(isobutyronitrile), p-toluene sulfonyl hydrazide, p-toluene sulfonyl(semicarbazide), carbohydrazide, p-p'-p-oxybis(benzenesulfonyl hydrazide), an ammonium salt of an organic acid, an ammonium salt of an inorganic acid, hydroxyl amine sulfate, carbamide, and a mixture thereof.

8. The method of claim 1, wherein the gas generating chemical is present in an amount of from about 0.3% to about 8% by weight of the aqueous fluid.

9. The method of claim 1, wherein the surfactant comprises a mixture of a foaming and a foam stabilizing surfactant.

10. The method of claim 1, wherein the surfactant comprises a surfactant selected from the group consisting of: an ethoxylated alcohol ether sulfate surfactant, an alkyl amidopropylbetaine surfactant, an alkene amidopropylbetaine surfactant, an alkyl amidopropyldimethylamine oxide surfactant, and an alkene amidopropyldimethylamine oxide surfactant.

11. The method of claim 1, wherein allowing the gas generating chemical to react so as to generate a gas in the well treatment fluid to form a lightweight well treatment fluid comprises allowing the gas generating chemical to react with an activator in the aqueous fluid, the activator comprising at least one component selected from the group consisting of: a base, a buffer, and an oxidizer.

* * * * *